Oct. 1, 1968    D. HARTLAND    3,403,888
REVERSIBLE PUMP TURBINES
Filed May 18, 1967    2 Sheets-Sheet 1

INVENTOR
Derek Hartland

3,403,888
REVERSIBLE PUMP TURBINES
Derek Hartland, Rugby, England, assignor to The English Electric Company Limited, London, England, a British company
Filed May 18, 1967, Ser. No. 639,575
Claims priority, application Great Britain, May 20, 1966, 22,716/66
4 Claims. (Cl. 253—1)

ABSTRACT OF THE DISCLOSURE

This invention is concerned with reducing the damaging pressure oscillation which tends to occur when a hydraulic turbine or reversible pump turbine abruptly and unexpectedly loses its load during turbine operation. A machine according to this invention has guide vanes which are arranged to close automatically according to a three-phase programme. During the first phase the guide vanes move relatively quickly towards their closed positions, but do not completely close; during the second phase they partially reopen; and during the third phase they move relatively slowly towards their closed positions.

---

This invention is concerned particularly with reversible pump turbines, that is to say hydraulic machines which can act either as a pump or as a turbine. Such machines are used for example in hydro-electric schemes in which off-peak electricity is used to power an electric motor which drives the hydraulic machine as a pump to transfer water from a low reservoir to a high reservoir. At other times, especially during peak periods of demand for electricity, the hydraulic machine is run in reverse as a turbine powered by water from the high reservoir and drives a generator which is usually the motor running in reverse.

A reversible pump turbine normally has adjustable guide vanes around the runner, and in order to stop the machine during turbine operation, the guide vanes are turned about their axes to positions in which they stop the flow of water from the penstock to the runner. This procedure is carried out at the end of each period during which the pump turbine is required to operate as a turbine. It is commonly also arranged to take place automatically in the event of the load on the generator being unexpectedly disconnected, so as to prevent the machine reaching an undesirably high run-away speed, and so as not to waste high-reservoir water.

At the end of the desired period of turbine operation it is normally possible to prepare for stopping the turbine by gradually reducing the load on the generator. However, at other times the load on the generator may be cut off abruptly and without warning, and on such occasions it has been found that severe oscillation of the water pressure in the penstock and in the hydraulic machine can occur. These oscillations can be sufficiently severe to cause serious damage to the machine or penstock by exceeding the safe pressure, and in the case of a machine with a vertical axis, the pressure peaks can even be sufficient to lift the pump-turbine runner (together with the generator rotor if solidly coupled) off its thrust bearing.

This can also apply to a pure turbine, and this invention is accordingly also applicable to turbines.

We have found that this pressure oscillation can be considerably reduced by programming the movement of the guide vanes in a manner such that, when the load on the turbine is abruptly cut off, the guide vanes first move relatively quickly towards their closed positions but, before they actually reach their closed positions, they begin to open again for a short while before finally moving slowly towards their closed positions. Accordingly this invention consists of providing a turbine or reversible pump turbine with a guide vane control mechanism which produces this guide vane closure programme, such a programme being characterised by the fact that it consists of a first phase during which the vanes are moved relatively quickly towards their closed positions, but do not completely close, a second phase during which they are at least partially re-opened, and a third phase during which the vanes are moved relatively slowly towards their closed positions.

The closure programme may be triggered off in any convenient manner, for example in response to the cut in the current flow through the generator (which may operate a solenoid-controlled servo-mechanism) or in response to the rise in turbine speed (sensed by a governor) which results from the loss of load.

This invention will be more fully explained with reference to the accompanying drawings. In these drawings.

Figure 4:
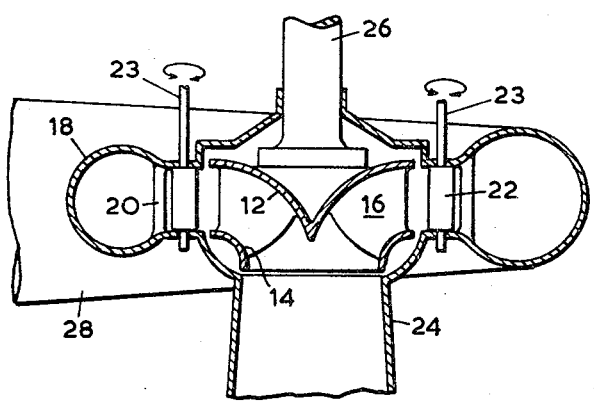
FIG. 4 is a diagrammatic sectional view of a typical pump turbine to which this invention may be applied.

As shown in FIG. 4, the pump turbine includes a runner having a crown 12 and a skirt 14 interconnected by vanes 16. Around the periphery of the runner there is a spiral casing 18 which during turbine operation delivers water to the runner through fixed guide vanes 20 and adjustable guide vanes 22, the water being discharged from the runner through a draft tube 24. A shaft 26 connects the runner to the rotor of an electrical machine (not shown) which can run either as a generator or as a motor. The guide vanes 22 are controlled by spindles 23 and can be rotated to positions in which they engage one another so as to substantially stop the flow of water into the runner from the spiral casing.

During pumping, the runner 10 draws water up the draft tube and delivers it out of a pipe 28 extending from the casing 18. The pipe 28 serves as the penstock during turbine operation; that is to say, it delivers water to the pump turbine from the high-level reservoir.

Figure 1:
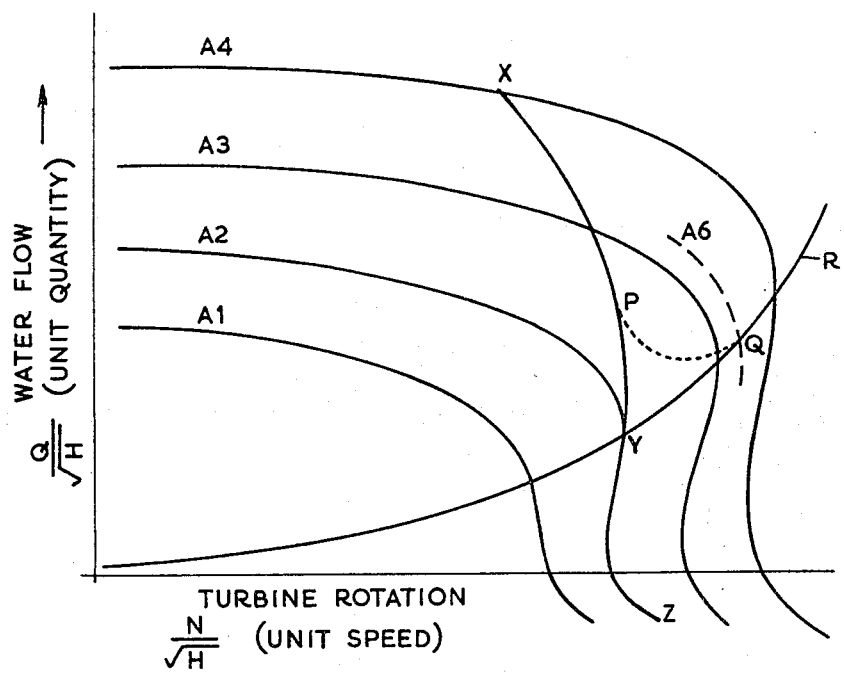
FIG. 1 is a graph showing a typical set of characteristic curves for a reversible pump turbine.

An outline of the theory behind the effect of this invention is best explained with reference to a typical set of characteristic curves for a pump turbine, as shown in FIG. 1.

FIG. 1 is a graph plotting $N\sqrt{H}$ (unit speed) against $Q\sqrt{H}$ (unit quantity), where N is the turbine speed, Q is the quantity of water flow, and H is the head at the turbine inlet. Four characteristic curves are shown for four different guide vanes angles $A_1$ to $A_4$. The curve R represents the zero torque state of the turbine at different guide vane settings. In other words, below the R curve the machine does not generate power but must instead be supplied with external power to maintain its rotation. Below the horizontal axis the value of Q is negative; that is to say, the machine is acting as a pump (though rotating in the opposite direction to that in which it normally pumps during off-peak periods).

During normal use as a turbine the machine operates at a point X which is at synchronous speed (i.e. the speed at which the generator driven by the turbine generates alternating current electricity at the appropriate frequency). On losing all of its load abruptly, the machine speeds up. Owing to the drooping shape of the characteristic curves, an increase in speed results in a decrease in unit quantity (i.e. $Q\sqrt{H}$). This effect is further increased by closing the guide vanes, and when the guide vanes reach the angle $A_2$, the turbine operation should reach and remain at the point Y. However, believe that owing to the inertia of the water in the turbine and in the upstream and downstream water conduits (which results in an initial pressure rise at the turbine inlet) and owing to the inertia of the rotating parts, the value of $N\sqrt{H}$ increases beyond the point Y and oscillates more or less between the point Y and a point Z which could be below the zero axis (or above the zero axis but below the R curve), with a consequent oscillation in water pressure.

In carrying out our invention, instead of closing the guide vanes all the way to the angle $A_2$ as soon as the load on the turbine is lost, we close the guide vanes part of the way and then partly re-open them, before finally closing them slowly, so that the turbine operation follows the locus XPQ. In essence this allows the initially high pressure rise (caused by the inertia of the water) to die away before the machine reaches the zero torque state. After the point Q has been reached, the guide vanes can be closed slowly so that the operating point moves slowly down along the zero torque curve R.

In practice the re-opening of the guide vanes (e.g. from P to Q) may stop at a suitable point short of completely opening the guide vanes (as shown in FIG. 1, where the opening is stopped at $A_6$). Alternatively the guide vanes may be re-opened all the way so that the locus of operating points approaches the curve R somewhat asymptotically.

Figure 2:
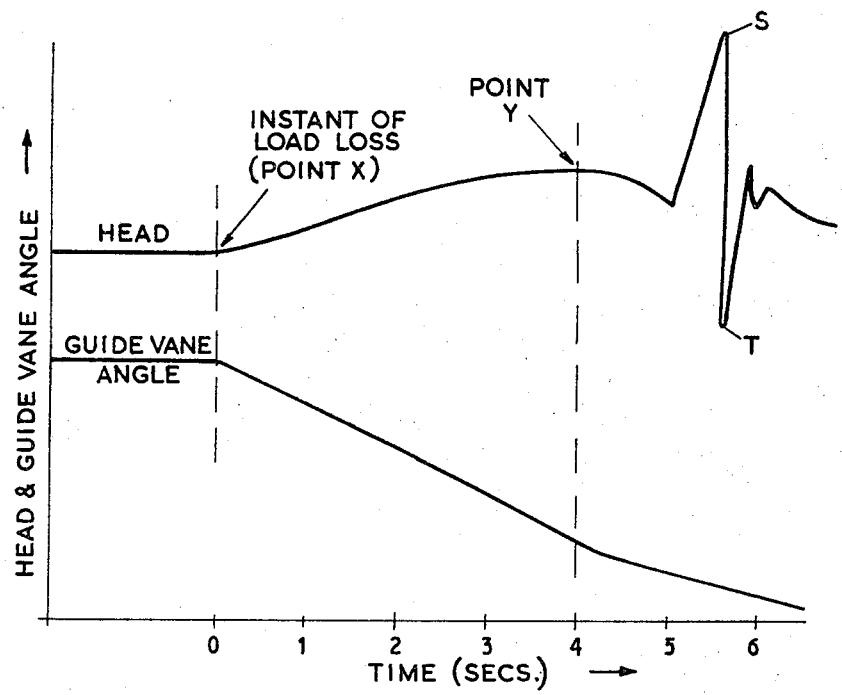
FIG. 2 is a graph showing what happens to a conventional pump turbine after a loss of load during turbine operation.

FIG. 2 shows an example of a conventional programme of guide vane closing following a loss of load, plotted on a time base. As shown, there is pronounced pressure oscillation shortly after passing the point Y, reaching in the case shown an upper peak S and a lower peak T. The first pressure wave may actually be a rise in pressure (as shown) or alternatively a fall in pressure, depending upon the various characteristics of the particular design. In contrast FIG. 3 shows a vane closure programme according to this invention and shows in particular how the re-opening of the guide vanes (along the part of the curve V) after the point P in FIG. 1 eliminates the pronounced pressure oscillation shown in FIG. 2, and leaves instead only a mild oscillation of pressure over the part W of the pressure curve.

Figure 3:
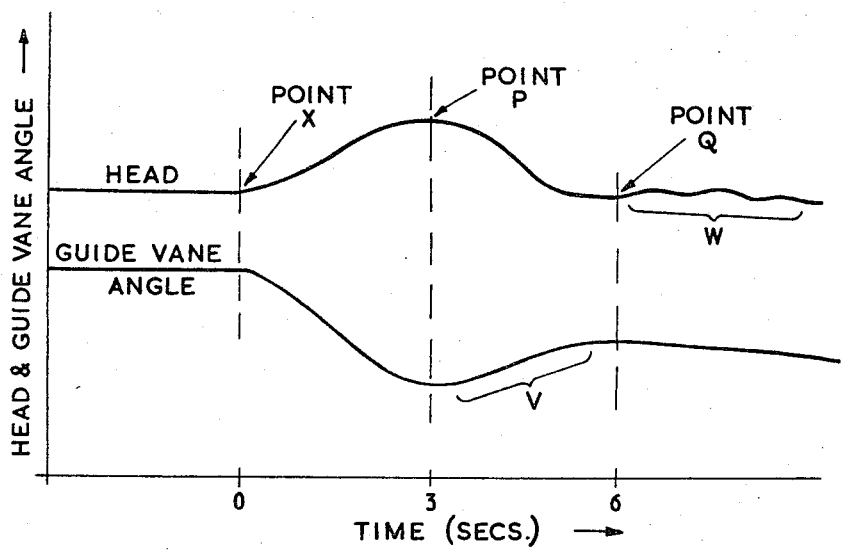
FIG. 3 is a graph similar to FIG. 2 but shows in contrast what happens to a pump turbine in accordance with this invention.

It should be noted that the scales of FIGS. 2 and 3 are different. Moreover the time scales shown relate only to one particular example and may in practice vary for different machines.

In general the best vane closure programme for any particular machine must be determined by experiment as the characteristics of different machines vary, and moreover because the operating characteristics of any given machine depend also on characteristics of the installation, for example the length of the penstock.

The timing of the three phases during the vane closure programme following a loss of load (and particularly the point in time at which the first phase of vane closing is concluded) should be determined individually for any given machine to avoid the operating point of the machine (as plotted in FIG. 1) falling below or substantially below the zero torque curve.

FIG. 3 shows the timing of the vane closure programme in one particular example. In this example the guide vanes at the point P (after which they start to re-open) have travelled through between 75% and 85% of their stroke (i.e. their angular movement from their fully open positions to their closed positions). The second phase of the closure programme (during which the vanes are partially re-opened) may, for example, end when the vanes reach approximately their half-way positions.

I claim:

1. A hydraulic machine operable as a turbine and having a runner to which water flows via adjustable guide vanes, and including programmed control means controlling the adjustable guide vanes so as at least to substantially reduce the flow of water through the machine in the event of an abrupt cutting off of the load of the machine during use as a turbine, the vane closure program produced by the programmed control means consisting of a first phase during which the vanes are moved relatively quickly towards their closed positions, but do not completely close, a second phase during which they are at least partially reopened, and a third phase during which the vanes are moved relatively slowly towards their closed positions.

2. A machine according to claim 1 in which the timing of the vane closure programme prevents the operating point of the machine, as represented on a graph of unit quantity plotted against unit speed, from falling below the zero torque curve.

3. A machine according to claim 1 in which the second phase of the closure programme begins when the vanes have moved through approximately 75% to 85% of their stroke towards their closed positions.

4. A method of substantially reducing the flow of water to an hydraulic turbine in the event of an abrupt cutting off of the load on the turbine, in which adjustable guide vanes controlling the flow of water to the turbine runner are programmed to close the vane closure program consisting of a first step of moving the vanes relatively quickly towards their closed positions, but not completely closed, a second step of moving the vanes at least partially to reopened positions, and a third step of moving the vanes relatively slowly towards their closed positions.

References Cited

UNITED STATES PATENTS

| | | | |
|---|---|---|---|
| 3,236,498 | 2/1966 | Kerensky | 253—24 |
| 3,238,534 | 3/1966 | Hartland | 253—1 X |
| 3,275,293 | 9/1966 | Hosogai et al. | 253—24 X |
| 3,276,461 | 10/1966 | Kerensky | 253—24 X |
| 3,309,057 | 3/1967 | Tonooka | 253—1 |

EVERETT A. POWELL, JR., *Primary Examiner.*